J. F. MONTINE.
CURRENT COLLECTOR.
APPLICATION FILED AUG. 25, 1919.

1,370,143.

Patented Mar. 1, 1921.
2 SHEETS—SHEET 1.

Inventor
J. F. Montine.

By

Attorneys

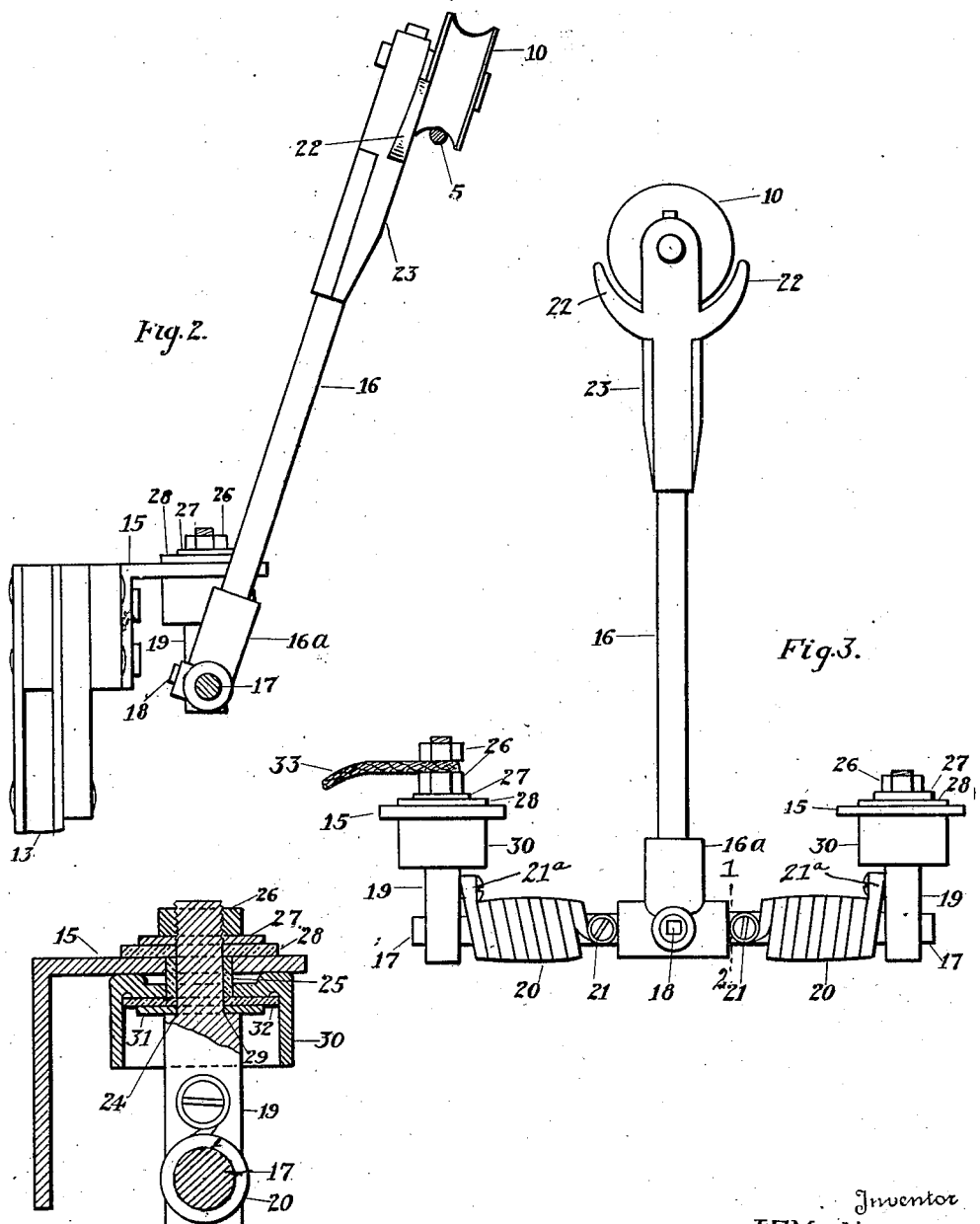

UNITED STATES PATENT OFFICE.

JOSEPH F. MONTINE, OF CHICAGO, ILLINOIS.

CURRENT-COLLECTOR.

1,370,143.     Specification of Letters Patent.     Patented Mar. 1, 1921.

Application filed August 25, 1919. Serial No. 319,674.

*To all whom it may concern:*

Be it known that I, JOSEPH F. MONTINE, a citizen of the United States, residing at Chicago, in the county of Cook and State of Illinois, have invented new and useful Improvements in Current-Collectors, of which the following is a specification.

The current collector which is the subject matter of the present application for patent is designed more particularly for use in connection with over-head transportation systems, such as apparatus for collecting and delivering mail matter, parcels, merchandise, etc., the same being characterized by an elevated track on which a truck or carriage travels, the latter being propelled by an electric motor obtaining current from an elevated conductor or trolley wire.

The invention has for its object to provide a novel and improved current collector for the purpose stated, the same being a trolley wheel which is so supported that there is no interruption in the collection of electric current along the route.

The object stated is attained by means of a combination and arrangement of parts to be hereinafter described and claimed, and in order that the same may be better understood, reference is had to the accompanying drawings forming a part of this specification.

In the drawings,

Fig. 2 is a similar view of the current collector;

Fig. 3 is a side elevation of the current collector, and

Fig. 4 is a sectional detail of a supporting element.

Figure 1:
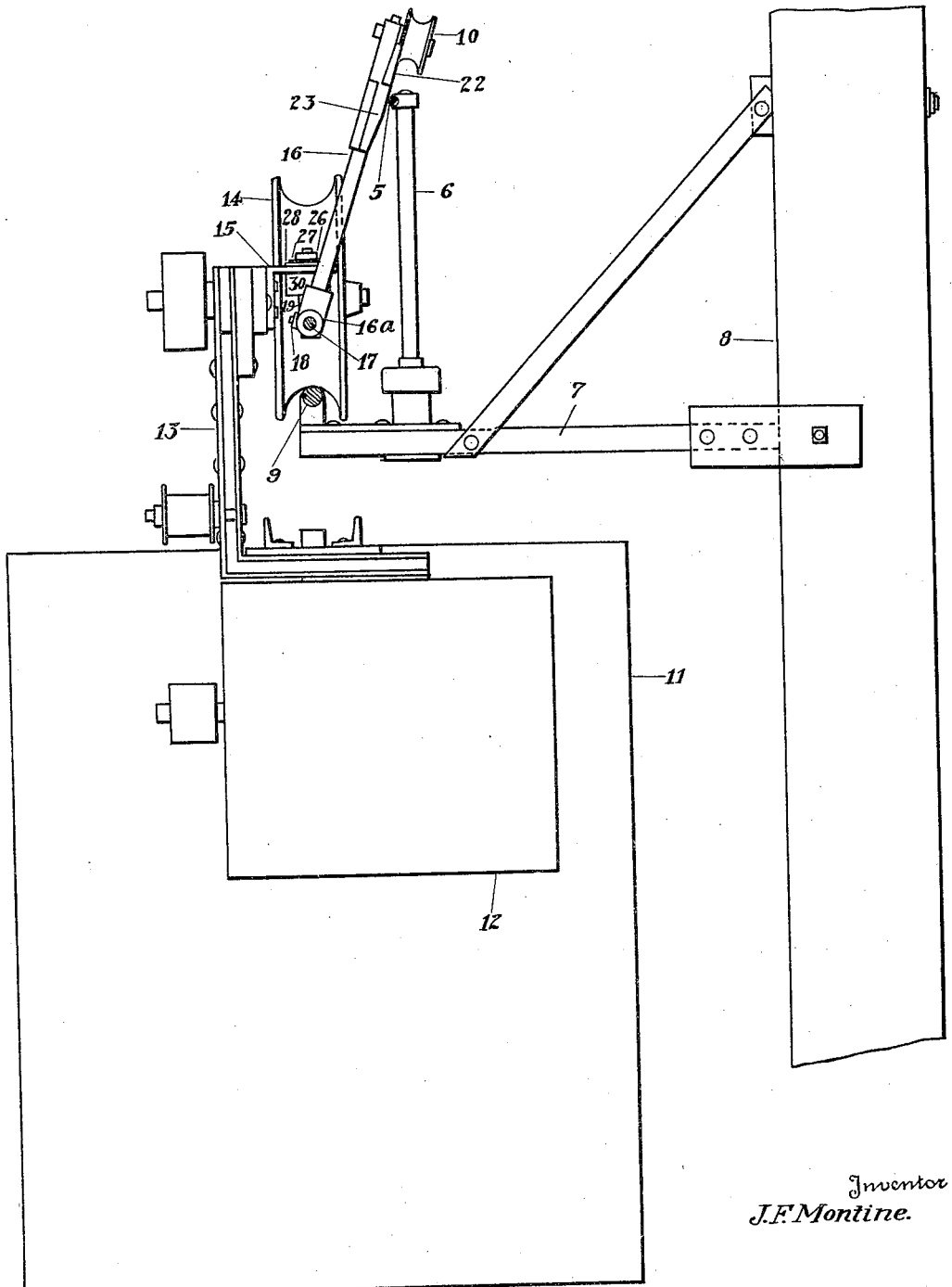
Figure 1 is an end elevation of the structure showing the application of the invention, and partly in section on the line 1—2 of Fig. 3.

Referring specifically to the drawing 5 denotes a trolley wire which is supported at suitable intervals by a standard 6 rising from and supported by a bracket structure 7 mounted on a post or pole 8. This bracket structure also supports a cable rail 9 on which is mounted for travel a truck or carriage driven by an electric motor which obtains current from the wire 5, the current collector being a trolley wheel 10. The truck or carriage is shown in outline at 11 and a housing inclosing the motor at 12. At one end of the truck is a suitable frame work 13 which supports the motor housing 12 and also the wheels 14 running on the cable 9 and obtaining motion from the motor by any suitable driving means, which latter need not be described as they form no part of the present disclosure. The frame 13 carries angle plates 15 which support a trolley pole 16.

The trolley wheel 10 is supported at the top of the pole 16 on one side thereof, and the latter is pivotally supported in such a manner that it is free to swing laterally of the truck 11, or transversely of the direction in which it travels, the trolley wire being located on one side of the pole.

The pivotal support for the trolley pole 16 is obtained by the following means:

To the bottom of the trolley pole is fitted a T-shaped casting $16^a$ positioned so that its alined branches extend in the direction of the length of the truck 11 or in the direction it travels, and the lateral branch extends upwardly and receives the lower end of the trolley pole, the latter being made fast in said branch in any suitable manner.

The T-shaped member $16^a$ is mounted on a rock shaft 17 and is made fast thereon by a set screw 18. The shaft 17 is supported at its ends by bearing stems 19 carried by and depending from the supporting plates 15. The shaft is loosely supported in bearing apertures in the stems 19 and it extends in the direction of travel of the truck 11. It will therefore be seen that the trolley pole and its wheel are free to swing transversely of the truck.

Around the shaft 17 are coiled springs 20 which are made fast to the shaft at one end, as shown at 21, and fastened at their other ends to the stems 19, as shown at $21^a$. The shaft is therefore spring-tensioned, the springs tending to keep the trolley pole swung over in the direction of the trolley wire 5 to maintain the contact of the wheel 10 with the latter. Upon loosening the set screw 18, the trolley pole may be swung relative to the shaft 17 to obtain the proper spring tension, after which the set screw is tightened.

At the top of the trolley pole 16 are two guide arms 22 extending forwardly and rearwardly, respectively, and curved to correspond to the contour of the wheel 10. These guide arms are located below and on opposite sides of the axis of the wheel, and close to the inner side thereof, in view of which it will be seen that they are inside the trolley wire 5 or between the latter and the trolley pole.

Below the trolley wheel 10, and the guide arms 22, the pole 16 is increased in diameter, as shown at 23 to obtain a bearing surface for the wire 5. When truck 11 is passing the supports 7 of the cable rail 9, it rises as the cable does not sag at these points, and hence the trolley wheel also rises and leaves the wire 5. However, when this occurs, the pole 16 comes in sliding contact with the wire at the enlarged portion 23, as shown in Fig. 1, and hence there is no interruption in the collection of current. When the truck clears the support 7, its weight sags the cable rail, and the trolley wheel now descends and again rides the trolley wire, as shown in Fig. 2, the wire being guided to the wheel by the arms 22. The part 23 of the trolley pole functions as a current collector only while the truck is passing the cable supports 7, but this is an important function as the trolley wheel cannot well pass over the support of the wire 5 at the top of the standard 6.

The stems 19 are each supported by and insulated from the plates 15 in the following manner:

The upper end of the stem is reduced as shown at 24, and passes through an aperture in the plate 15, with a bushing 25 of insulating material around the stem. The upper end of the stem projects from the top of the plate and is threaded to receive a nut 26. Between the nut and the top of plate are interposed washers 27 and 28, the latter being next to the plate and therefore made of insulating material.

Between the under side of the plate 15 and the shoulder 29 on the stem 19 formed by the reduced upper end 24 thereof, is supported a hood 30, with washers 31 and 32 interposed between the shoulder and the hood. The washer 32 which is next to the hood is of insulating material.

To one of the stems 19 is connected a conductor 33 which carries the current taken off the wire 5 to the motor.

I claim:

A current collector for an electric-motor driven truck, comprising a trolley wheel, a pole carrying the wheel and pivotally supported to swing transversely of the truck, said pole having a current collecting surface below the wheel, and guide arms extending forwardly and rearwardly from the pole above said bearing surface.

In testimony whereof I affix my signature.

JOSEPH F. MONTINE.